United States Patent Office 3,332,948
Patented July 25, 1967

3,332,948
DERIVATIVES OF 1,3-DIAZA-CYCLOALK-2-ENE
Herbert Morton Blatter, Millburn, N.J., assignor to Ciba Corporation, New York, N.Y., a corporation of Delaware
No Drawing. Filed June 20, 1963, Ser. No. 289,394
The portion of the term of the patent subsequent to Jan. 12, 1982, has been disclaimed
11 Claims. (Cl. 260—251)

The present invention concerns 1,3-diaza-cycloalk-2-ene compounds. More especially it relates to 2-alkyl-1-Ph-1,3-diaza-cycloalk-2-enes, in which Ph is phenyl substituted by hydroxyl, phenyl substituted by etherified hydroxyl, phenyl substituted by organic acyloxy, phenyl substituted by nitro, phenyl substituted by amino, or phenyl substituted by N-substituted amino, and in which the 1,3-diaza-cycloalk-2-ene portion has from five to seven ring members, and the tautomers thereof having a 1,3-diaza-cycloalk-3-ene ring system, and salts of such compounds, as well as process for their manufacture.

More particularly, the invention relates to compounds of the formula

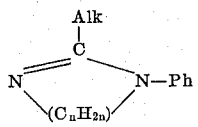

in which Ph has the above-given meaning, Alk is alkyl, and the group of the formula —$(C_nH_{2n})$— is alkylene having from two to seven carbon atoms and separating the two nitrogen atoms by two to four carbon atoms, and the tautomers thereof having a 1,3-diaza-cycloalk-3-ene ring system, and acid addition salts of such compounds.

The compounds of this invention have preferably the 1,3-diaza-cycloalk-2-ene ring system, but may also be in the form of the tautomeric 1,3-diaza-cycloalk-3-ene ring system.

A phenyl radial Ph is substituted by one or more than one hydroxyl, etherified hydroxyl, organic acyloxy, nitro, amino or N-substituted amino group attached to any position available for substitution. The group Ph represents primarily (hydroxy)-phenyl, (etherified hydroxy)phenyl, especially (lower alkoxy)-phenyl, in which lower alkoxy is methoxy, ethoxy, n-propyloxy, isopropyloxy, n-butyloxy, isobutyloxy, n-pentyloxy, isopentyloxy and the like, as well as (lower alkenyloxy)-phenyl, in which lower alkenyloxy is allyloxy, methallyoxy and the like, (lower alkylenedioxy)-phenyl, in which lower alkylenedioxy is methylenedioxy and the like, (carbocyclic aryl-oxy)-phenyl, in which carbocyclic aryl-oxy is phenyloxy and the like, (carbocyclic aryl-lower alkoxy)-phenyl, in which carbocyclic aryl lower alkoxy is, for example, phenyl-lower alkyloxy, e.g. benzyloxy, 2-phenylethyloxy and the like, (carboxy-lower alkoxy)-phenyl, in which carboxy-lower alkoxy is carboxymethoxy, 2-carboxyethoxy and the like, or [(carboxy-lower alkoxy)-lower alkoxy]-phenyl, in which (carboxy-lower alkoxy)-lower alkoxy is (carbo - methoxy) - methoxy, (carbethoxy)-methoxy and the like, (organic acyl-oxy)-phenyl, such as (lower alkanoyloxy)-phenyl, in which lower alkanoyloxy is acetyloxy, propionyloxy, pivalyloxy and the like, as well as (lower alkoxy-carbonyloxy)-phenyl, in which lower alkoxy - carbonyloxy is methoxy - carbonyloxy, ethoxycarbonyloxy and the like, (nitro)-phenyl, (amino)-phenyl, or (N-substituted)-phenyl, such as (N-monosubstituted amino)-phenyl, for example, (N-lower alkylamino)-phenyl, in which N-lower alkyl-amino is N-methylamino, N-ethylamino and the like, or (N-acylamino)-phenyl, for example, (N-lower alkanoyl-amino)-phenyl, in which N-lower alkanoyl-amino is N-acetylamino, N-propionylamino, N-pivalylamino and the like, or (N,N-di-substituted amino)-phenyl, for example, (N,N-di-lower alkylamino)-phenyl, in which N,N-di-lower alkyl-amino is N,N-dimethylamino, N,N-di-ethylamino and the like.

The alkyl group Alk substituting the 2-position of the 1,3-diazo-cycloalk-2-ene ring system, is primarily lower alkyl, having from one to seven, preferably from one to four, carbon atoms, e.g. methyl, ethyl, n-propyl, isopropyl, n-butyl, isobutyl, secondary butyl or tertiary butyl, as well as n-pentyl, isopentyl, n-hexyl, n-heptyl and the like.

As mentioned above, the 1,3-diaza-cycloalk-2-ene portion has from five to seven ring members. The alkylene radical of the formula —$(C_nH_{2n})$—, having from two to seven carbon atoms, separates the two nitrogen atoms by two to four carbon atoms; its carbon atoms may be unsubstituted or contain one or more than one lower alkyl group as substituents, e.g. methyl, ethyl, n-propyl, isopropyl and the like. The group of the formula —$(C_nH_{2n})$— may, therefore, represent 1,2-ethylene, 1,3-propylene or 1,4-butylene, as well as 1,2-propylene, 1,2-butylene, 2,3-butylene, 1,3-butylene, 2-methyl-1,2-propylene, 1,4-pentylene and the like.

Salts of the compounds of this invention are acid addition salts, such as the pharmaceutically acceptable, non-toxic acid addition salts with inorganic acids, e.g. hydrochloric, hydrobromic, nitric, sulfuric, phosphoric acids and the like, or with organic acids, such as organic carboxylic acids, e.g. acetic, glycolic, maleic, hydroxymaleic, fumaric, malic, tartaric, citric, benzoic, salicylic, 4-aminosalicylic, 2-acetoxy-benzoic, nicotinic, isonicotinic acid and the like, or organic sulfonic acids, e.g. methane sulfonic, ethane sulfonic, 2-hydroxy-ethane sulfonic, benzene sulfonic, toluene sulfonic, 2-naphthalene sulfonic acid and the like. Further acid addition salts are useful as intermediates, for example, in the manufacture of other acid addition salts, such as pharmaceutically acceptable acid addition salts, or in the purification of the free compounds, as well as for identification and characterization purposes. Salts which are primarily used for the latter are, for example, those with acidic organic nitro compounds, e.g. picric, picrolonic, flavianic acid and the like, or with metal complex acids, e.g. phosphotungsteic, phosphomolybdic, chloroplatinic, Reinecke acid and the like.

The compounds of this invention have diuretic and natriuretic properties and are, therefore, used as diuretic and natriuretic agents in the treatment of excessive water and/or salt retention, due to heart insufficiency, kidney diseases and the like, or are useful intermediates for the preparation of the pharmacologically active compounds. The latter are remarkably free from undesired or secondary pharmacological properties, such as excretion of potassium, or effects on the central nervous system, such as stimulation and the like.

Particularly useful as diuretic and natriuretic agents or as intermediates for the preparation of the active compounds are the compounds of the formula

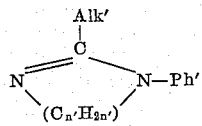

in which Ph' is (hydroxy)-phenyl, (lower alkoxy)-phenyl, (phenyl-lower alkoxy)-phenyl, (nitro)-phenyl, or (amino)-phenyl, Alk' is lower alkyl, and the group of the formula —$(C_{n'}H_{2n'})$— is alkylene having from two to four carbon atoms and separating the two nitrogen atoms by two to three carbon atoms, as well as the tautomers thereof having the 1,3-diaza-cycloalk-3-ene ring system, and acid addition salts, particularly pharmaceutically acceptable acid addition salts, thereof. Such compounds are represented, for example, by those of the formula

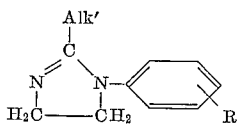

in which Alk' has the above-given meaning, and R is hydroxyl, lower alkoxy, nitro or amino, and the acid addition salts, particularly the pharmaceutically acceptable acid addition salts, thereof.

The compounds of this invention may be used in the form of compositions for enteral or parenteral use, which contain the new compounds or the salts thereof in admixture with a pharmaceutically acceptable organic or inorganic, solid or liquid carrier. For making up the preparations, there can be employed substances which do not react with the new compounds, such as water, gelatine, lactose, sucrose, wheat starch, corn starch, stearic acid, magnesium stearate, calcium stearate, talc, vegetable oils, benzyl alcohol, stearyl alcohol, gums, tragacanth, propylene glycol, polyalkylene glycols, or any other pharmaceutically acceptable carrier material. The pharmaceutical preparations may be in solid form, for example, as capsules, tablets, dragees, suppositories and the like, or in liquid form, for example, as solutions, suspensions, emulsions and the like. If desired, they may contain auxiliary substances, such as preserving, stabilizing, wetting, emulsifying, coloring, flavoring agents and the like, salts for varying the osmotic pressure, buffers, etc. They may also contain, in combination, other useful substances.

The compounds of this invention are prepared according to known methods. A preferable procedure comprises reacting an N-Ph-alkylene-diamine compound, in which Ph has the previously given meaning, and alkylene separates the two nitrogen atoms by two to four carbon atoms, with an alkanoic acid, having at least two carbon atoms, a functional derivative thereof, or an equivalent analog thereof, and, if desired, converting a substituent of the phenyl portion Ph of a resulting compound into another substituent, and/or, if desired, converting a resulting salt into the free compound or into another salt, and/or, if desired, converting a resulting compound into a salt thereof.

While an alkanoic acid having at least two carbon atoms, such as acetic, propionic, butyric, isobutyric acid and the like, may possibly be used in the above ring closure reaction, it is advantageous to use a functional derivative thereof, such as an ester, for example, a lower alkyl ester, e.g. methyl ester, ethyl ester and the like, thereof, or, more particularly, a tri-lower alkyl ortho ester, e.g. triethyl ortho ester and the like, of an alkanoic acid. Other functional derivatives of an alkanoic acid are, for example, its amides, or the N-substituted imido lower alkyl ethers thereof and the like, whereas an equivalent analog of an alkanoic acid, capable of serving in the above reaction, is, for example, a thio-amide thereof, and the like.

The reaction of the diamine starting material with the alkanoic acid, or one of its functional derivatives, or an equivalent analog thereof, is carried out in the absence of an additional solvent, particularly, if the reagent is simultaneously a suitable diluent, such as a tri-lower alkyl ortho-alkanoate, e.g. a triethyl ortho-lower alkanoate and the like. If desired, the reaction mixture may be diluted with a solvent, e.g. ethanol, n-propanol, diethyleneglycol dimethylether, or any other suitable diluent. The reaction is preferably performed at an elevated temperature, if necessary, in a closed vessel under pressure, and/or, in the atmosphere of an inert gas, e.g. nitrogen.

The starting materials are known or may be prepared according to known methods; the asymmetrically substituted alkylenediamines are preferably prepared according to the Gabriel reaction.

The compounds of this invention may also be prepared by ring-closing an N-Ph-N-$R_1$-N'-$R_2$-alkylene diamine, in which Ph has the previously-given meaning, and alkylene separates the two nitrogen atoms by two to four carbon atoms, and in which one of the groups $R_1$ and $R_2$ is alkanoyl having at least two carbon atoms, and the other is hydrogen or alkanoyl having at least two carbon atoms, and, if desired, carrying out the optional steps.

The above ring-closing reaction is carried out according to known methods, for example, by heating the starting material, if necessary, in the presence of a diluent, or by treating it with a suitable reagent, such as phosphorus pentachloride, calcium oxide and the like. If necessary, it is performed in a closed vessel and/or in the atmosphere of an inert gas, e.g. nitrogen.

The starting material used in the above procedure is prepared according to known methods, for example, by reacting an N-Ph-alkylenediamine with a suitable functional derivative of an alkanoic acid having at least two carbon atoms, such as a lower alkyl alkanoate, e.g. an ethyl lower alkanoate and the like, and isolating the desired N-lower alkanoylated intermediate. Obviously, the starting materials may, therefore, be formed as intermediates in the previously-described reaction for the preparation of the compounds of the invention without being isolated.

In the above procedures, certain substituents of the phenyl portion, such as amino, hydroxyl and the like, may have to be protected temporarily, for example, by acylation, etherification and the like; furthermore, they may be present in the form of functional groups, which are capable of being converted into such substituents. After the reaction, such groups are then converted or reconverted into the desired substituents.

Certain substituents attached to the phenyl portion Ph of a resulting compound may be converted into other substituents. For example, a nitro group may be converted into amino according to known reduction methods, for example, by controlled treatment with hydrogen in the presence of a suitable catalyst, e.g. palladium on charcoal and the like. Furthermore, a lower alkoxy, e.g. methoxy and the like, group may be converted into a free hydroxyl group, for example, by acidic hydrolysis with hydrobromic acid in the presence of acetic acid, treatment with pyridine hydrochloride and the like. Furthermore, a group capable of being split by hydrogenolysis, e.g. a benzyloxy group and the like, may be converted into hydroxyl by treatment with catalytically activated hydrogen.

A resulting acid addition salt may be converted into the free compound by treatment with an alkaline reagent, such as a metal hydroxide, e.g. lithium hydroxide, sodium hydroxide, potassium hydroxide, calcium hydroxide, and the like, a metal carbonate, e.g. sodium, potassium or calcium carbonate or hydrogen carbonate and the like, ammonia or any other suitable reagent, such as a hydroxyl ion exchange preparation and the like.

A resulting acid addition salt may be converted into another salt; for example, an acid addition salt with an inorganic acid may be reacted with a suitable metal, e.g. sodium, barium, silver and the like, salt of an acid in the presence of a solvent, in which a resulting inorganic compound is insoluble and is thus removed from the reaction medium. The conversion of one salt into another may also be achieved by treatment with an anion exchange preparation.

A free compound may be converted into its acid addition salt by reacting it, preferably a solution thereof, with an acid or with an anion exchange preparation, and isolating the desired salt. The latter may be obtained in the form of a hydrate thereof or may contain solvent of crystallization.

The invention also comprises any modification of the process wherein a compound formed as an intermediate at any stage of the process of this invention is used as starting material and the remaining step(s) of the process is (are) carried out, as well as any new intermediates.

In the process of this invention those starting materials are preferably used which lead to the final products mentioned in the beginning as the preferred embodiments of the invention.

The following examples are intended to illustrate the invention and are not to be construed as being limitations thereon. Temperatures are given in degrees centigrade.

Example 1

A mixture of 1 g. of N-(3-methoxy-phenyl)-ethylenediamine and 5 ml. of triethyl orthopropionate is heated to 190–200° for three hours while maintaining an atmosphere of nitrogen and allowing the generated ethanol to evaporate. The excess of triethyl orthopropionate is distilled off, and the residue is extracted with boiling pentane. The organic solution is decolorized with a charcoal preparation and evaporated to dryness. The resulting 2-ethyl-1-(3-methoxy-phenyl)-2-imidazoline of the formula

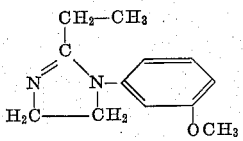

is dissolved in diethyl ether and treated with a concentrated solution of hydrogen bromide in isopropanol; the 2 - ethyl - 1 - (3 - methoxy - phenyl) - 2 - imidazoline hydrobromide (yield: 0.6 g.) is recrystallized from a mixture of ethanol and diethyl ether, M.P. 152–155°.

The starting material used in the above procedure is prepared as follows: A mixture of 127.0 g. of N-(2-bromoethyl)phthalimide and 123.0 g. of m-anisidine is heated for two hours on the steam bath, whereupon the mixture solidifies. It is diluted with water; the organic material is extracted with diethyl ether. The organic solution is cooled overnight to yield 90.0 g. of the crude N-[2-(3-methoxy-phenyl)-aminoethyl]-phthalimide, which upon extraction with boiling cyclohexane and recrystallization, melts at 99–103°.

A mixture of 35.0 g. of N-[2-(3-methoxy-phenyl)aminoethyl]-phthalimide and 6.5 g. of 99–100 percent hydrazine hydrate in 500 ml. of 95 percent ethanol is refluxed for twenty-one hours. The solid is filtered off; the filtrate is concentrated to yield an additional amount of the solid product. The combined crops are dissolved in a mixture of 200 ml. of 20 percent aqueous sodium hydroxide and 200 ml. of water; the solution is extracted with methylene chloride, and the organic solution is dried over sodium sulfate and concentrated. The resulting crude N-(3-methoxy-phenyl)-ethylenediamine is extracted with boiling hexane and precipitates upon cooling; it melts at 45–46°.

Example 2

A mixture of 10.0 g. of N-(4-nitro-phenyl)-ethylenediamine and 55 ml. of triethyl orthoacetate is heated to 190–200° for thirty-five minutes, while maintaining an atmosphere of nitrogen and allowing the generated ethanol to evaporate. The excess of the triethyl acetate is distilled off, and the solid residue is crystallized from acetone to yield 6.1 g. of the 2-methyl-1-(4-nitro-phenyl)-2-imidazoline of the formula

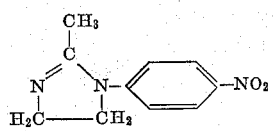

which melts at 148–149° after recrystallization from carbon tetrachloride.

The starting material used in the above procedure is prepared as shown in Example 1, by reacting the N-(2-bromoethyl)-phthalimide with 4-nitro-aniline, and cleaving the resulting N-[2 - (4 - nitro - phenyl) - aminoethyl]-phthalimide with hydrazine hydride; it melts at 152°.

Example 3

A solution of 1.0 g. of 2-methyl-1-(4-nitro-phenyl)-2-imidazoline in 100 ml. of ethanol is hydrogenated at atmospheric pressure in the presence of 0.1 g. of a 10 percent palladium-on-charcoal catalyst. After the uptake of the theoretical amount of hydrogen (about one hour), the catalyst is filtered off, and the filtrate is evaporated to dryness. The crude 1-(4-amino-phenyl)-2-methyl-2-imidazoline of the formula

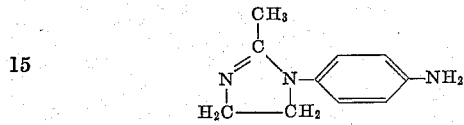

(yield: 0.64 g.) is recrystallized from benzene after treatment with a charcoal preparation; M.P. 165–166°.

Example 4

A mixture of 1.0 g. of N-(3-methoxy-phenyl)-1,3-propylenediamine and 5 ml. of triethyl orthopropionate is heated to 190–200° for two hours while maintaining an atmosphere of nitrogen and allowing the generated ethanol to evaporate. The excess of triethyl orthopropionate is distilled off, and the residue is extracted several times with hot pentane; the organic solution is decolorized with a charcoal preparation and concentrated to dryness. The residue is dissolved in diethyl ether, and the solution is treated with a concentrated solution of hydrogen chloride in isopropanol to yield 0.3 g. of the 2-ethyl-1-(3-methoxy-phenyl)-1,4,5,6-tetrahydro-pyrimidine hydrobromide of the formula

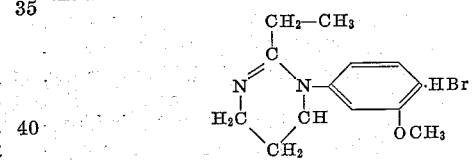

which melts at 155–156° after recrystallization from a mixture of ethanol and diethylether.

The starting material used in the above procedure is prepared as follows: A mixture of 134.0 g. of N-(2-bromoethyl)-phthalimide and 123.0 g. of m-anisidine is heated for three hours on the steam bath, and is then diluted with water. The organic material is extracted with diethyl ether, from which a solid material precipitates; it is filtered off and treated with 600 ml. of 1 N hydrochloric acid. The acid solution is filtered, the filtrate is cooled, and the desired N-[3-(3 - methoxy - phenyl)-propylamine]-phthalimide precipitates; it melts at 97–100° after repeated recrystallization from a mixture of methanol and water.

A mixture of 1.0 g. of N-(3-methoxy-phenyl)-1,3-propylamine]-phthalimide in 300 ml. of 95 percent ethanol and 6.2 g. of 99–100 percent hydrazine hydrate is refluxed for twenty-four hours. After cooling, the reaction mixture is allowed to stand for several days; the precipitate is filtered off, and an additional amount of solid material is recovered after concentrating the filtrate. The combined precipitates are dissolved in 200 ml. of 2 N sodium hydroxide and 200 ml. of water; the organic material is extracted with three portions of diethyl ether, which are combined, dried over sodium sulfate and evaporated to dryness. The remaining oily N-(3-methoxy-phenyl)-1,3-propylenediamine is distilled and collected at 192–193°/15 mm.

Example 5

A mixture of 1.0 g. of N-(3 - methoxy - phenyl) - 1,3 propylenediamine and 5 ml. of triethyl orthoacetate is heated to 190–200° for two hours while maintaining an atmosphere of nitrogen and allowing the generated ethanol to evaporate. The reaction mixture is worked-up as described in Example 4; the resulting 1,3-methoxy-phenyl)-2-methyl-1,4,5,6-tetrahydropyrimidine hydrobromide of the formula

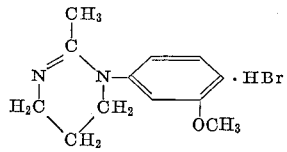

(yield: 0.65 g.) melts at 184–186° after recrystallization from a mixture of ethanol and diethyl ether.

Other compounds prepared according to the above procedure by selecting the appropriate starting materials are, for example, 1-(3-hydroxy-phenyl)-2-methyl-2-imidazoline,
2-ethyl-1-(4-hydroxy-phenyl)-2-imidazoline,
2-isopropyl-1-(3-methoxy-phenyl)-2-imidazoline,
1-(3-ethoxy-phenyl)4-methyl-2-imidazoline,
1-(2-methoxy-phenyl)-2,4,5-trimethyl-2-imidazoline,
1-(4-benzyloxy-phenyl)-2-n-propyl-2-imidazoline,
1-(4-allyloxy-phenyl)-2-ethyl-2-imidazoline,
1-(4-acetyloxy-phenyl)-2-n-butyl-2-imidazoline,
1-(4-ethoxycarbonyloxy-phenyl)-2-ethyl-2-imidazoline,
1-(3-methoxy-phenyl)-2,4-dimethyl-1,4,5,6-tetrahydropyrimidine,
1-(4-amino-phenyl)-2-ethyl-1,4,5,6-tetrahydropyrimidine,
1-(4-N,N-dimethyl-amino-phenyl)-2-ethyl-2-imidazoline,
1-(N-ethylamino)-phenyl-2-methyl-1,3-diaza-cyclohept-2-ene,
1-(4-N-acetylamino-phenyl)-2-n-propyl-2-imidazoline and the like.

Upon treatment with an acid, e.g. hydrogen chloride, hydrogen bromide, maleic acid and the like, the above compounds may be converted into their acid addition salts, e.g. hydrochlorides, hydrobromides, maleates and the like. The picrate of 2-ethyl-1-(3-methoxy-phenyl)-2-imidazoline is prepared by treating a solution of the free compound in ethanol with picric acid.

What is claimed is:
1. A member selected from the group consisting of a compound of the formula

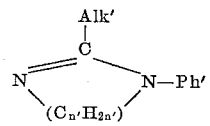

in which Ph' is a member selected from the group consisting of (hydroxy)-phenyl, (lower alkoxy)-phenyl, phenyl-lower alkoxy)-phenyl, (nitro)-phenyl, and (amino)-phenyl, Alk' is lower alkyl, and the group of the formula —($C_n'H_{2n'}$)— is alkylene having from two to four carbon atoms and separating the two nitrogen atoms by two to three carbon atoms, and a tautomer thereof having the 1,3-diaza-cycloalk-3-ene ring system and an acid addition salt of said compounds.

2. A member selected from the group consisting of a compound of the formula

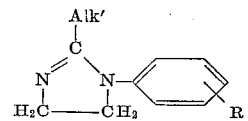

in which Alk' is lower alkyl, and R is a member selected from the group consisting of hydroxyl, lower alkoxy, nitro and amino and an acid addition salt thereof.

3. A member selected from the group consisting of 2-ethyl-1-(3-methoxy-phenyl)-2-imidazoline and an acid addition salt thereof.

4. 2-ethyl-1-(3-methoxy-phenyl)-2-imidazoline hydrobromide 5. 2-methyl-1-(4-nitro-phenyl)-2-imidazoline.

6. 1-(4-amino-phenyl)-2-methyl-2-imidazoline.

7. A member selected from the group consisting of 2-ethyl-1-(3-methoxy-phenyl)-1,4,5,6-tetrahydropyrimidine and an acid addition salt thereof.

8. 2-ethyl-1-(3-methoxy-phenyl)-1,4,5,6-tetrahyropyrimidine hydrobromide.

9. A member selected from the group consisting of 1-(3-methoxy-phenyl)-2-methyl-1,4,5,6-tetrahydropyrimidine and an acid addition salt thereof.

10. 1-(3-methoxy-phenyl)-2-methyl-1,4,5,6-tetrahydropyrimidine hydrobromide.

11. A member selected from the group consisting of a compound of the formula

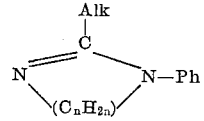

in which Ph is a member selected from the group consisting of hydroxy-phenyl, lower alkoxy-phenyl, lower alkenyloxy-phenyl, lower alkylenedioxy-phenyl, phenoxy-phenyl, phenyl-lower alkoxy-phenyl, carboxy-lower alkoxy phenyl, [(carboxy-lower alkoxy)-lower alkoxy]-phenyl, (lower alkanoyloxy)-phenyl, (lower alkoxy-carbonyloxy)-phenyl, nitro-phenyl, amino-phenyl, N-(lower alkyl-amino)-phenyl, N,N-(di-lower alkylamino)-phenyl and N-(lower alkanoylamino)-phenyl, Alk is alkyl, and the group of the formula —($C_nH_{2n}$)— is alkylene having from two to seven carbon atoms and separating the two nitrogen atoms by two to four carbon atoms, and a tautomer thereof having a 1,3-diaza-cycloalk-3-ene ring system, and an acid addition salt of said compounds.

References Cited
UNITED STATES PATENTS 3,159,647  12/1964  Poppelsdeof _____ 260—251
3,165,529   1/1965  Blatter _____ 260—250

OTHER REFERENCES

Wertheim: Textbook of Organic Chemistry, pp. 763–764 (1945).

NICHOLAS S. RIZZO, *Primary Examiner.*